(12) United States Patent
Ramachandran Vijayalekshmi et al.

(10) Patent No.: US 10,884,842 B1
(45) Date of Patent: Jan. 5, 2021

(54) AUTOMATIC TRIAGING

(71) Applicant: INTUIT INC., Mountain View, CA (US)

(72) Inventors: Deepesh Ramachandran Vijayalekshmi, Mountain View, CA (US); Maneesh Pawar, Mountain View, CA (US); Munchoon Seetho, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 93 days.

(21) Appl. No.: 16/190,980

(22) Filed: Nov. 14, 2018

(51) Int. Cl.
| | |
|---|---|
| *G06F 11/00* | (2006.01) |
| *G06F 11/07* | (2006.01) |
| *G06F 11/34* | (2006.01) |
| *G06K 9/62* | (2006.01) |
| *G06N 20/00* | (2019.01) |

(52) U.S. Cl.
CPC .......... *G06F 11/079* (2013.01); *G06F 11/008* (2013.01); *G06F 11/0751* (2013.01); *G06F 11/0769* (2013.01); *G06F 11/3476* (2013.01); *G06K 9/6223* (2013.01); *G06K 9/6256* (2013.01); *G06K 9/6276* (2013.01); *G06N 20/00* (2019.01); *G06F 2201/865* (2013.01)

(58) Field of Classification Search
CPC ............. G06F 11/0706; G06F 11/0718; G06F 11/3612; G06F 11/3636; G06F 11/366; G06F 11/3668; G06F 11/3672; G06F 11/3688; G06F 11/0178

USPC ........................................................ 714/38.1
See application file for complete search history.

(56) References Cited

U.S. PATENT DOCUMENTS

| | | | | |
|---|---|---|---|---|
| 2011/0320400 | A1* | 12/2011 | Namini ................... | G06F 16/21 707/610 |
| 2012/0159268 | A1* | 6/2012 | LeCroy ................... | H04L 51/04 714/57 |
| 2013/0124928 | A1* | 5/2013 | Daily ................. | G05B 19/0423 714/48 |
| 2013/0262082 | A1* | 10/2013 | McKeeman ............ | G06F 40/20 704/9 |
| 2014/0181584 | A1* | 6/2014 | Peng ....................... | G06F 11/26 714/25 |
| 2015/0019910 | A1* | 1/2015 | Simon ................. | G06F 11/1402 714/16 |
| 2015/0019916 | A1* | 1/2015 | Kane ....................... | H04L 43/12 714/39 |

(Continued)

*Primary Examiner* — Sarai E Butler
(74) *Attorney, Agent, or Firm* — DLA Piper LLP (US)

(57) ABSTRACT

Classifying a problem associated with an application may include receiving a log including a record of at least one operation performed by at least one application. The classifying may include generating a vector based on the record. The classifying may include comparing the vector to a plurality of trained vectors each being associated with a separate label. The classifying may include determining a most similar one of the plurality of the trained vectors to the vector based on the comparing. The classifying may include assigning the label associated with the most similar one of the plurality of trained vectors to the vector. The classifying may include selecting a recipient from among a plurality of available recipients based on the label assigned by the processor. The classifying may include causing the log to be further processed by the recipient.

24 Claims, 10 Drawing Sheets

(56) References Cited

U.S. PATENT DOCUMENTS

| | | | |
|---|---|---|---|
| 2015/0100836 A1* | 4/2015 | Wang | G06F 11/0706 |
| | | | 714/57 |
| 2018/0113773 A1* | 4/2018 | Krishnan | G06F 11/008 |
| 2019/0180030 A1* | 6/2019 | Wei | G06F 21/566 |
| 2020/0004870 A1* | 1/2020 | Dulam | G06K 9/6223 |
| 2020/0026566 A1* | 1/2020 | Baggerman | G06F 9/5027 |

* cited by examiner

AUTOMATIC TRIAGING

DETAILED DESCRIPTION OF SEVERAL EMBODIMENTS

Computing devices may be configured to run and/or access one or more applications. Applications may be local to the computing device, so that they are stored in local device memory and executed by the device's processor. Applications may also be remote, so that they may be hosted by remote servers and accessed by the device through a network. Applications may also be configured to operate partially locally and partially remotely. In any case, applications may include a large amount of code that may be susceptible to coding errors, corruption, and or other issues giving rise to application problems and/or failures. Moreover, applications with a remote component may be subject to network-related problems and/or failures, and/or interactions between different applications and/or devices may cause problems and/or failures. Also, some problems and/or failures may only arise under certain operating conditions, such that the underlying issue may not cause problems every time the application is run. Given the complexity of the issues that can lead to application problems and/or failures, it may be difficult to prevent all such issues prior to deployment, and it may be difficult to determine the root causes of such issues when they occur.

Embodiments disclosed herein may offer solutions that may identify root causes and provide solutions and/or notify appropriate individuals and/or processes. The disclosed embodiments may perform such identification and remediation in a manner that is accurate and fast without significant processor and/or memory demands in real time or near real time, thereby providing technical improvements over other systems and methods configured to identify and/or remediate problems in executing applications. For example, in some embodiments, processor and/or memory intensive machine learning may be performed prior to deployment of a prediction service, and the prediction service may leverage the results of the machine learning to return quick, but accurate, results.

Figure 1:
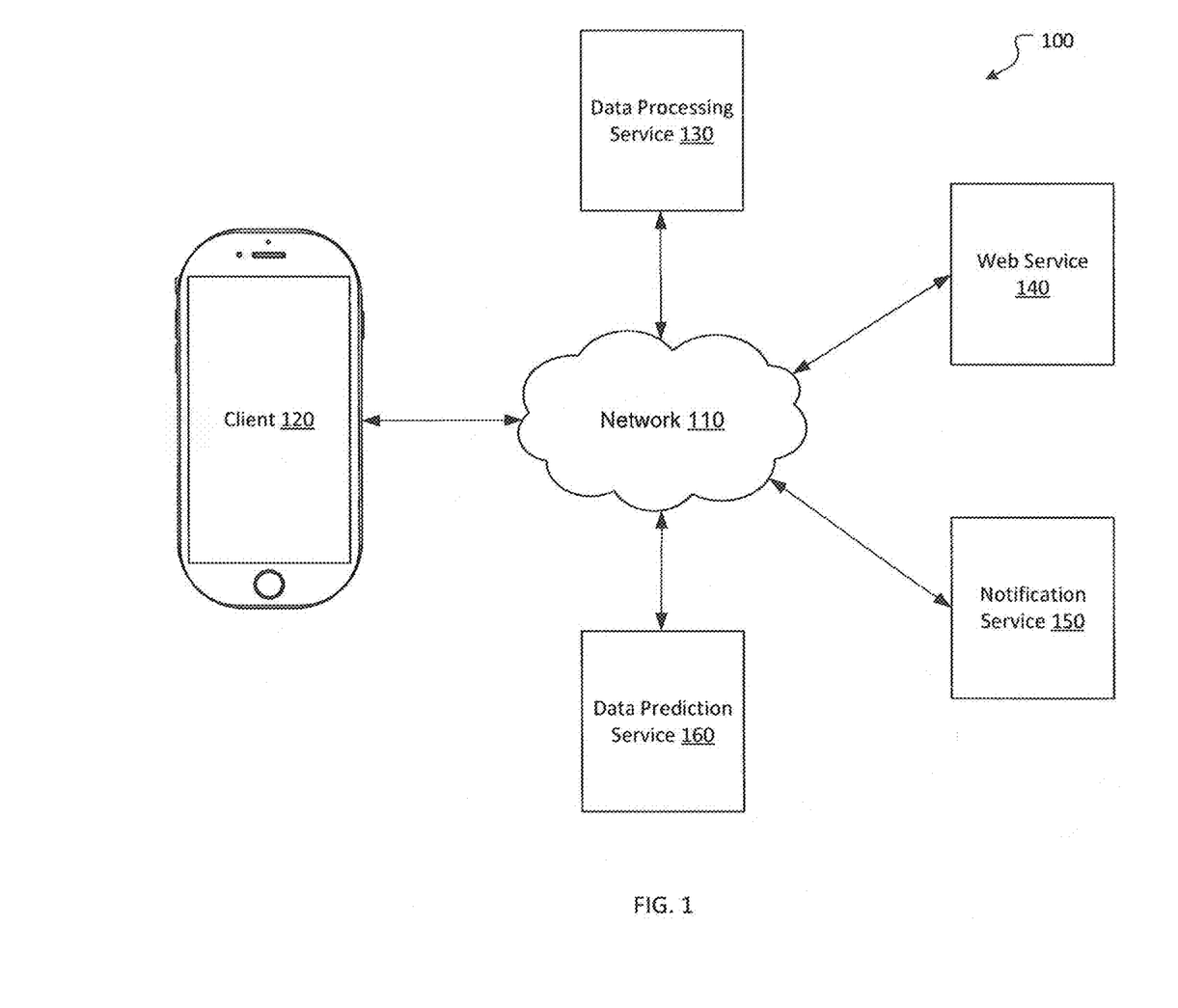
FIG. 1 shows a system configured to perform automatic triaging operations according to an embodiment of the present disclosure.
Figure 2:
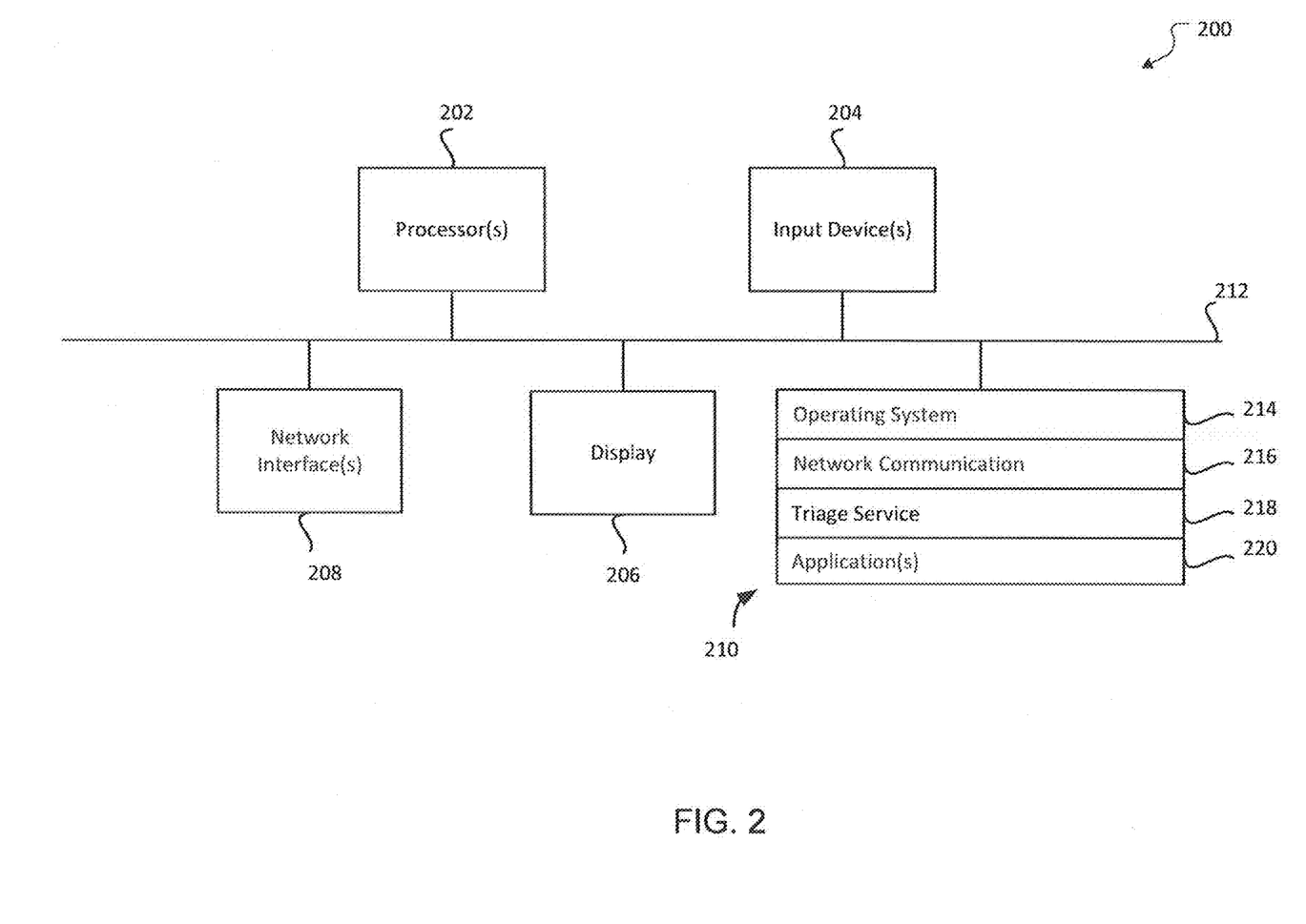
FIG. 2 shows a computing device according to an embodiment of the present disclosure.

FIG. 1 shows a system configured to perform automatic triaging operations according to an embodiment of the present disclosure. System 100 may include elements such as at least one client 120, data processing service 130, web service 140, notification service 150, and/or data prediction service 160. Each of these elements may include one or more physical computing devices (e.g., which may be configured as shown in FIG. 2). In some embodiments, one physical computing device may provide at least two of the elements, for example any combination of data processing service 130, web service 140, notification service 150, and/or data prediction service 160 may be provided by a single computing device In some embodiments, client 150 may be any device configured to provide access to remote applications. For example, client 150 may be a smartphone, personal computer, tablet, laptop computer, or other device.

The elements may communicate with one another through at least one network 110. Network 110 may be the Internet and/or other public or private networks or combinations thereof. For example, in some embodiments, at least data processing service 130, web service 140, notification service 150, and data prediction service 160 may communicate with one another over secure channels (e.g., one or more TLS/SSL channels). In some embodiments, communication between at least some of the elements of system 100 may be facilitated by one or more application programming interfaces (APIs). APIs of system 100 may be proprietary and/or may be examples available to those of ordinary skill in the art such as Amazon® Web Services (AWS) APIs or the like.

Specific examples of the processing performed by the elements of system 100 in combination with one another are given below. However, the roles of client 120, data processing service 130, web service 140, notification service 150, and data prediction service 160 may be summarized as follows. Client 120 may run, use, and/or interact with a service monitored by the other elements of system 100. For example, client 120 may have the service installed thereon, and may execute code to operate the service, or client 120 may interact with a server hosting the service (not shown) through network 110 to access the service. Data processing service 130 may perform relatively high processor load operations such as building and training models that may be used to triage problems identified between client 120 and the monitored service. Web service 140 may function as a data repository for, and/or may provide other services for, data processing service 130. Web service 140 may include database functionality (e.g., an AWS S3 database or other database). Notification service 140 may send notifications to appropriate parties (e.g., to parties subscribed to notification service 140) based on actions by other elements of system 100. Data prediction service 160 may use models generated by data processing service 130 to triage the problems experienced by client 120 so that they may be addressed in an efficient and/or appropriate manner.

Client 120, data processing service 130, web service 140, notification service 150, and data prediction service 160 are each depicted as single devices for case of illustration, but those of ordinary skill in the art will appreciate that client 120, data processing service 130, web service 140, notification service 150, and/or data prediction service 160 may be embodied in different forms for different implementations. For example, data processing service 130, web service 140, notification service 150, and/or data prediction service 160 may include a plurality of devices, may be embodied in a single device or device cluster, and/or subsets thereof may be embodied in a single device or device cluster. In another example, a plurality of clients 120 may be connected to network 110 and may have their activities analyzed as described herein. A single user may have multiple clients 120, and/or there may be multiple users each having their own client(s) 120. Furthermore, as noted above, network 10 may be a single network or a combination of networks, which may or may not all use similar communication protocols and/or techniques.

FIG. 2 is a block diagram of an example computing device 200 that may implement various features and processes as described herein. For example, computing device 200 may function as client 120, data processing service 130, web service 140, notification service 150, data prediction service 160, or a portion or combination of any of these elements. In some embodiments, a single computing device 200 or cluster of computing devices 200 may provide each of data processing service 130, web service 140, notification service 150, and data prediction service 160, or a combination of two or more of these services. Computing device 200 may be implemented on any electronic device that runs software applications derived from instructions, including without limitation personal computers, servers, smart phones, media players, electronic tablets, game consoles, email devices, etc. In some implementations, computing device 200 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Triage service instructions 218 may include instructions that perform the various homomorphic key derivation functions as described herein. Triage service instructions 218 may vary depending on whether computing device 200 is functioning as client 120, data processing service 130, web service 140, notification service 150, data prediction service 160, or a combination thereof.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3A:
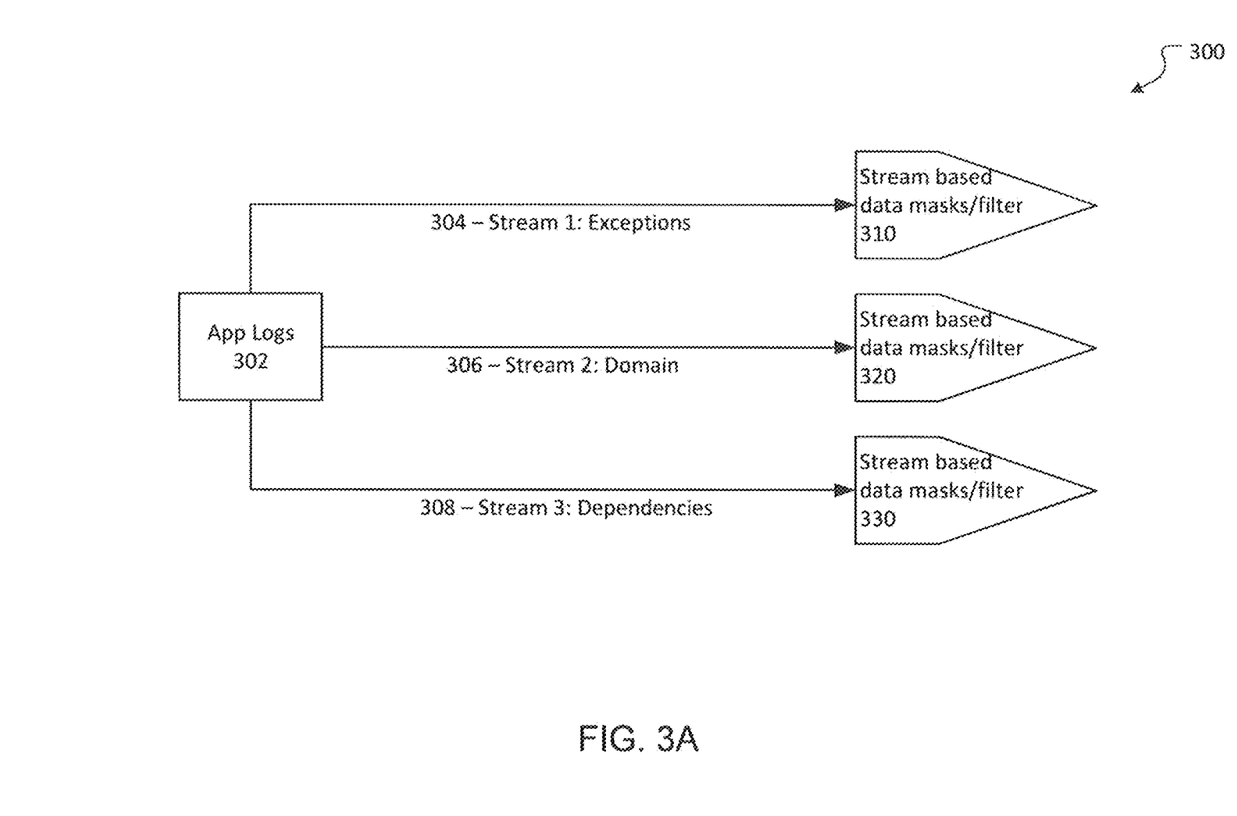
FIGS. 3A-3C show a data processing and prediction process according to an embodiment of the present disclosure.
Figure 3B:
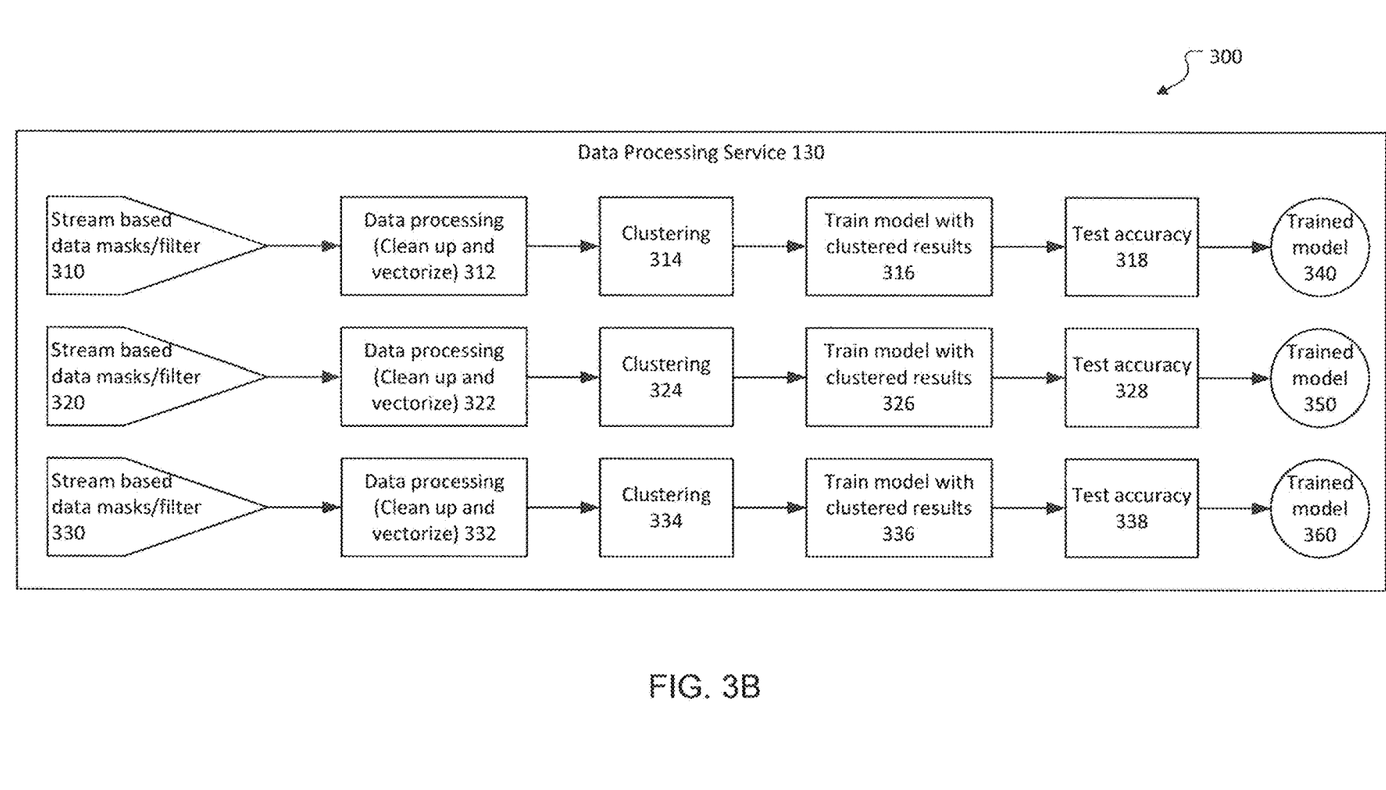
Figure 3C:
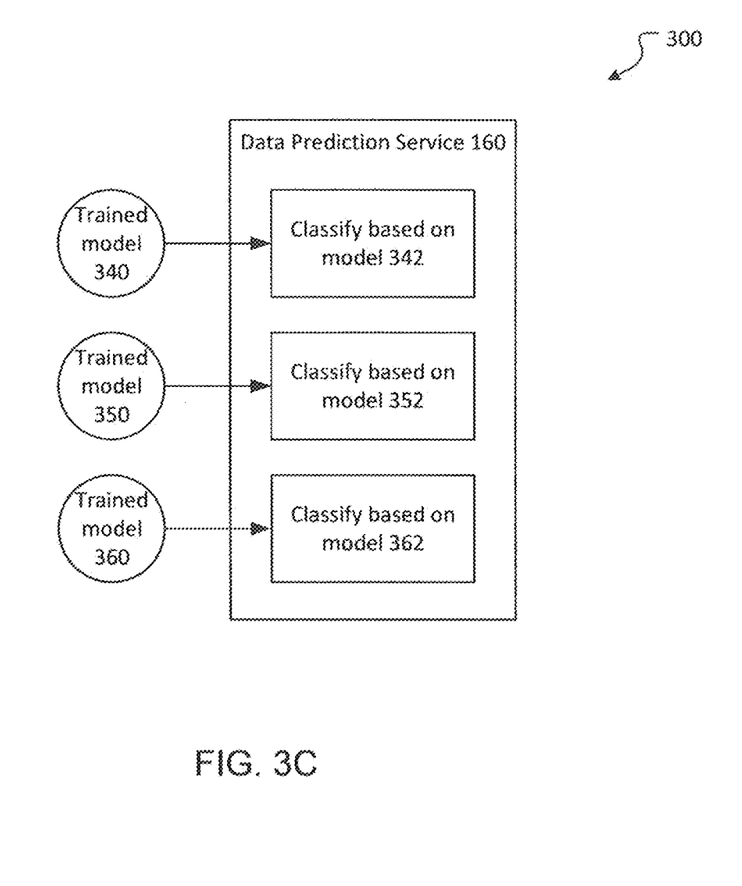

FIGS. 3A-3C show a data processing and prediction process 300 according to an embodiment of the present disclosure. System 100 elements, such as data processing service 130, web service 140, notification service 150, and/or data prediction service 160, may perform process 300 to triage issues arising from client 120 operating an application. Process 300 may demonstrate an overview of automatic triage processing, and various specific aspects of process 300 according to some embodiments are illustrated in more detail in FIGS. 4A-6. FIGS. 3A-3B may represent a training phase of process 300, and FIG. 3C may represent an operational phase of process 300.

At 302, one or more application logs may be generated and/or retrieved. The application logs may be generated by client(s) 120, stored by web service 140 and/or data processing service 130, and received and/or retrieved by data processing service 130. For example, client 120 may be configured to generate logs including one or more operations performed by an application. Many applications may be configured to generate logs, and the logs may include a record of all operations performed by the application or a subset thereof. For example, in some cases, client 120 may only record log data including application operations ongoing when a problem or failure occurs and/or operations preceding a problem or failure (e.g., a predetermined number of operations or all operations within a predetermined time before the problem or failure took place). In any case, the log may provide a record of application status during and/or before a problem or failure. The application logs used herein may include a single log from a single application instance, or the application logs may include a plurality of logs relating to a same type of application problem, relating to a variety of problems with a same application, and/or logs collected by a single client 120 or a plurality of clients 120.

At 304, 306, and 308, each application log may be classified as belonging to one of a plurality of streams for further processing. Three streams, exception, domain, and dependencies, are shown in the example of FIG. 3A, although more or fewer streams may be present in various embodiments. Each stream may include application logs representing, or suspected to represent, a different type of problem (e.g., an exception problem, a domain problem, or a dependency problem). Accordingly, data processing service 130 may perform a preliminary filtration of application logs by classifying the application logs by stream. For example, data processing service 130 may examine each log for one or more key words or strings (e.g., stored by data processing service 130 and/or web service 140) that may be indicative of a particular stream. For example, a log may include an "exception" error, and data processing service 130 may place that log in the exception stream. In some embodiments, if a log has more than one issue of more than one type, it may be placed in each stream for each applicable type. In some embodiments, key words or strings may be modifiable (e.g., by user input and/or machine learning feedback) to correct classification errors, introduce new stream types, and/or address new types of problems that may begin to appear.

At 310, 320, and 330, data processing service 130 may perform masking and/or filtration on the logs in the respective streams to remove less relevant data and thereby facilitate faster and/or more accurate processing for further steps of process 300. For example, data processing service 130 may retrieve one or more libraries of text samples of errors (e.g., stored by data processing service 130 and/or web service 140) and compare the samples with the operations in a log to identify matching or nearly-matching snippets of the log. The matching/nearly-matching snippets may be preserved, and the other text within the log may be filtered out. Accordingly, the filtering may result in data containing only erroneous code for further processing in process 300. Each stream may have a separate library, or the streams may have separate sub-libraries beneath a general library applicable to all streams. Accordingly, data processing service 130 may apply filtering specific to each stream to identify errors related to the stream and filter out errors related to other issues. In some embodiments, libraries may be modifiable (e.g., by user input and/or machine learning feedback) to correct errors in the samples, introduce new samples, and/or address new types of problems that may begin to appear. In some embodiments, the masking and/or filtering may need not be performed.

At 312, 322, and 332, data processing service 130 may perform processing on the filtered data in each stream to prepare the filtered data for machine learning processing. For example, data processing service 130 may generate a vector representation of the filtered data for each individual log. Data processing service 130 may use a variety of algorithms to generate the vector representation. For example, data processing service 130 may perform term frequency inverse document frequency (TFIDF) processing on filtered data for a log to generate a vector representing the significance of one or more terms in the filtered data for the log. TFIDF is used in the examples herein, but other embodiments may use other vector methodologies such as count vectorizers and/or hash vectorizers. The TFIDF processing example is described in greater detail below with respect to process 400 of FIGS. 4A-4B.

At 314, 324, and 334, data processing service 130 may perform clustering of the vectors to generate training data for each stream. For example, data processing service 130 may use any type of machine learning or other clustering algorithms, such as K-mans clustering, means-shift clustering, density-based clustering, expectation-maximization clustering, and/or agglomerative hierarchical clustering, for example, to group similar vectors together. Data processing service 130 may label the clusters using one or more natural language libraries including natural language terms corresponding to the vectors. The K-means clustering and labeling example is described in greater detail below with respect to process 400 of FIGS. 4A-4B.

At 316, 326, and 336, data processing service 130 may train a model for each stream based on the labeled clusters. For example, data processing service 130 may use any type of machine learning or other training algorithms, such as K-nearest-neighbor, random forest, naïve Bayes, logistic regression, decision tree, and/or neural network, for example, to train the models. In some embodiments, data processing service 130 may generate a model for each specific problem within each stream. Each trained model may represent a sample of what a problem looks like, and future classification of problems experienced by clients 120 may include comparing the problem to the models, as described below. In some embodiments, the training of each stream's model may be a processing and/or memory intensive process, and performing the training prior to classifying actual problems in progress may allow the classifying to leverage the accumulated log data without performing intensive processing at the time of analysis.

At 318, 328, and 338, data processing service 130 may test the models for each stream. For example, data processing service 130 may analyze each model to determine the model's accuracy. The analyzing may include comparing the model with a known example set of operations causing a problem of the type the model is purported to represent. If the model is at least as accurate as some threshold accuracy, data processing service 130 may accept the model for use as trained models 340, 350, and/or 360. For example, data processing service 130 may require models to have at least 80% accuracy when compared with a known problem. Data processing service 130 may reject models having less than the threshold accuracy, and these models may be retrained (e.g., 316, 326, and/or 336 may be repeated for the failed model(s)). In some embodiments, testing may need not be conducted.

At 342, 352, and 362, data prediction service 160 may use trained models 340, 350, and 360 to classify problems experienced by clients 120. For example, as described in greater detail below, data prediction service 160 may compare a vectorized log from a client 120 to at least one model from at least one stream to determine whether the vector of the log matches any vector of any model. If a match is found, data prediction service 160 may label the vectorized log as including a problem of the type having the natural language label for the corresponding log (e.g., as determined at 314, 324, and 334). Data prediction service 160 may cause the labeled log to be processed by a recipient selected based on the label. For example, notification service 150 may notify an appropriate user of the problem (e.g., including providing the label for faster problem identification and remediation) and/or may pass the problem to an automated remediation system corresponding to the label. In some embodiments, the notification of the user may include identifying a specific user or group that deals with problems of the specific labeled type. In any case, data prediction service 160 may be able to classify the problem through a simple vector match, allowing for accurate, processing/memory efficient, and real time or near real time triage.

Figure 4A:
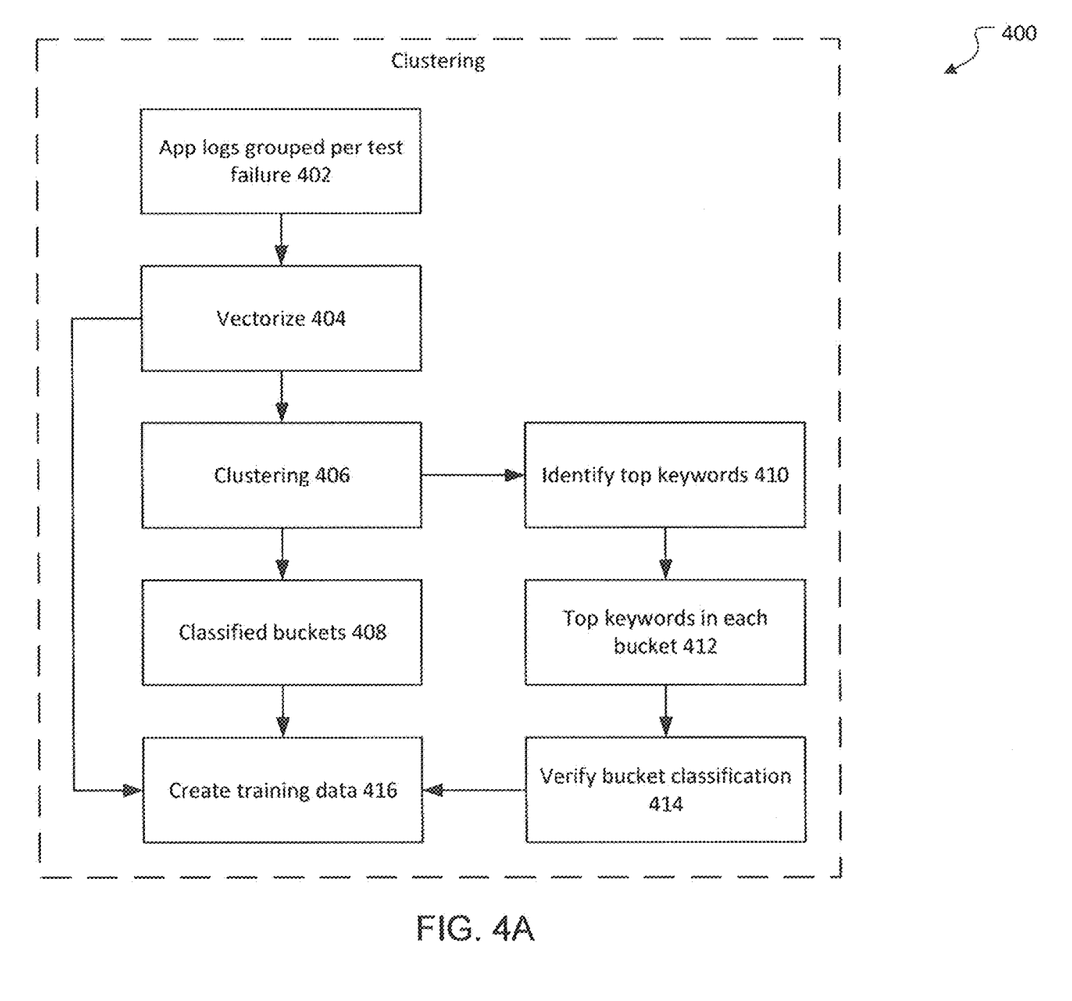
FIGS. 4A-4B show a data clustering and classification process according to an embodiment of the present disclosure.
Figure 4B:
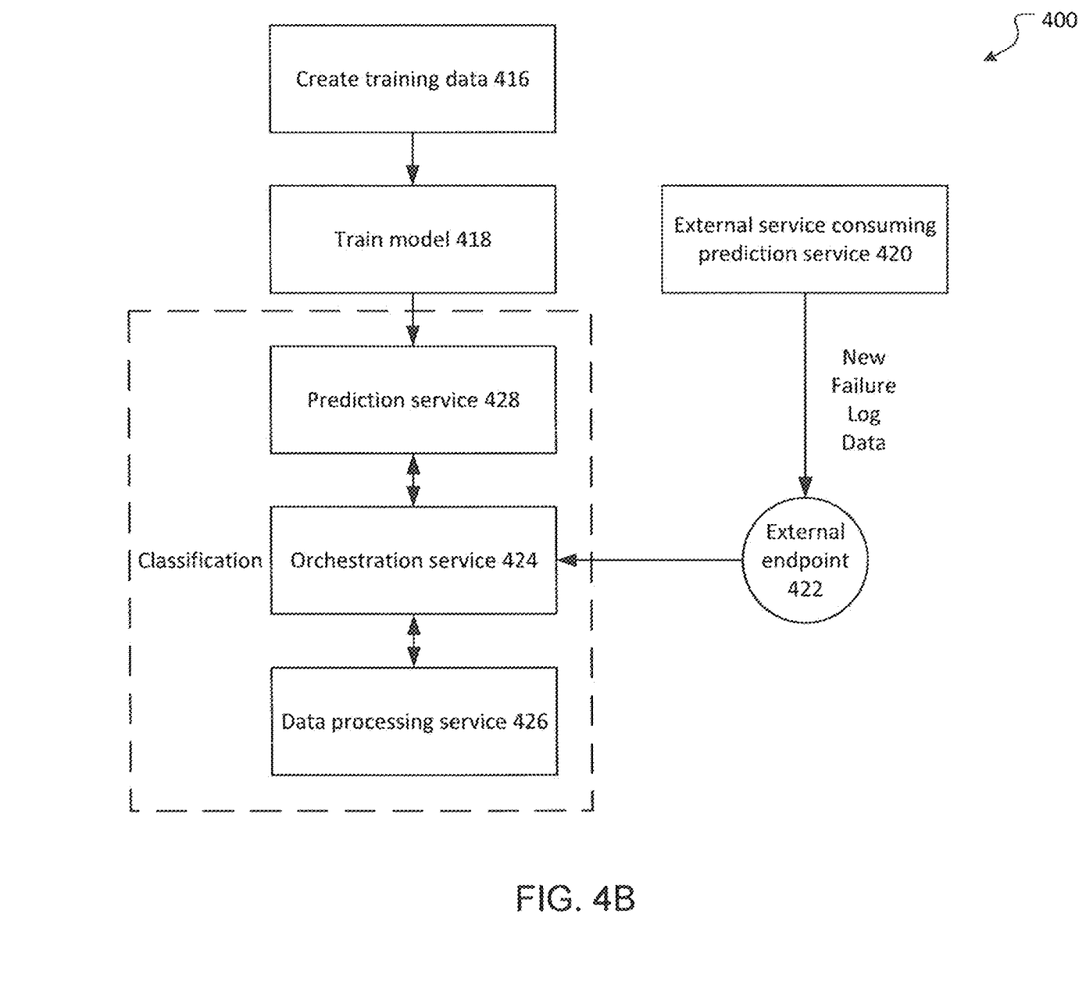

FIGS. 4A-4B show a data clustering and classification process 400 according to an embodiment of the present disclosure. Process 400 illustrates some details of the clustering and classification that were omitted from the higher-level process 300 description for clarity. For example, process 400 may represent a specific embodiment of process 300 wherein specific clustering, training, and/or classification methods are used. However, it will be apparent to those of ordinary skill in the art that some specific methods in process 400 may be exchanged for other specific methods without fundamentally altering the overall clustering and classification scope.

FIG. 4A illustrates the clustering phase of process 400. At 402, data processing service 130 may receive application logs grouped per test failure. For example, as described above at 302-330, logs may be received, grouped into streams based on problem or failure type (e.g., exceptions, domains, dependencies, etc.), and filtered.

At 404 data processing service 130 may vectorize the logs. For example, as noted above, data processing service 130 may perform term frequency inverse document frequency (TFIDF) processing on filtered data for a log to generate a vector representing the significance of one or more terms in the filtered data for the log. In the TFIDF example, data processing service 130 may determine how frequently a given term appears in a source of truth, such as within the entire set of all filtered data. The term's frequency of appearance in the data set may be the "term frequency." A lower term frequency may indicate a more unique term having a greater rarity as compared with a high-frequency term which appears often. Data processing service 130 may also determine how frequently the term appears within the filtered data for the log itself. The term's frequency count within the filtered data for the log itself may be the "document frequency." A higher document frequency may indicate a more important term to the meaning of the log as compared with a low-frequency term within the log. Data processing service 130 may determine a weight for the vector as the term frequency times the inverse of the document frequency. Data processing service 130 may therefore give the highest weights to terms that appear at a low frequency within the overall data set, but that occur at a high frequency (e.g., multiple times) within logs in which they do occur. Data processing service 130 may generate a vector for the term and log and store the vector locally and/or with web service 140.

At 406, data processing service 130 may perform clustering of the vectors generated at 404. For example, as noted above, data processing service 130 may use K-means clustering to generate clusters of similar vectors. In some embodiments, data processing service 130 may use standard K-means clustering algorithms to partition n vectors into k clusters in which each vector belongs to the cluster with the nearest mean. As a result, at 408, data processing service 130 may generate a set of clusters (or "classified buckets"). Each bucket may have a different vector, and each bucket may represent a different type of problem or failure evident in the logs provided at 402. K-means clustering may be an NP-hard operation, meaning that data processing service 130 may require significant computational power to perform the clustering. However, clustering at this stage of process 400 may allow the classification portion of process 400 to function with relatively minimal computational power and/or at high speed.

At 410-414, data processing service 130 may label the classified buckets from 408. For example, at 410, data processing service 130 may identify top keywords for classification. Data processing service 130 may use one or more libraries of natural language terms to identify the keywords. For example, data processing service may use the natural language toolkit (NLTK) suite of libraries. The vectors determined as described above may each correspond to different natural language terms in the NLTK. Data processing service 130 may identify these terms based on the vectors. At 412, data processing service 130 may apply an identified term from the NLTK to each bucket according to vector, so that the buckets may be labeled with a term matching the vector for the bucket generated at 406 and 408. At 414, the bucket classifications may be verified. In some embodiments, this may be done manually by a user interacting with a user interface provided by data processing service 130, for example.

At 416, data processing service 130 may create training data from the classified buckets. For example, data processing service 130 may apply the labels generated at 410414 to the buckets generated at 406-408, thereby producing a training data set.

FIG. 4B illustrates the training and classification phases of process 400. At 418, data processing service 130 may train models for the training data set. For example, data processing service 130 may apply a k-nearest-neighbors machine learning algorithm to the training data set, thereby producing a model for each specific problem within each stream. Each trained model may represent a sample of what a problem looks like, and future classification of problems (e.g., at 426-428 described below) may utilize the trained models. Because the training data may have been labeled with the name of the problem at 416, the trained models may be labeled similarly. Accordingly, when the trained models are used (e.g., when a problem is matched with a trained model), system 100 may be able to associate the label with the problem. As with the clustering of 406, data processing service 130 may require significant computational power to perform the training. However, training at this stage of process 400 may allow the classification portion of process 400 to function with relatively minimal computational power and/or at high speed.

With a trained model in place, system 100 may be equipped to classify real problems experienced by clients 120. In some embodiments, system 100 may be consumed by one or more external services 420. For example, specific clients 120 and/or applications may be registered with system 100 and may provide data for analysis by system 100 to enable problem and/or failure classification. As external services 420 (e.g., clients 120 and/or applications) experience problems and/or failures, they may report failure log data to external endpoint 422, which may be a part of data prediction service 160 and/or may be in communication with data prediction service 160.

Due to the clustering and training described above, the processing by data prediction service 160 to classify a problem or failure may be computationally efficient and fast. In some embodiments, data prediction service 160 may include orchestration service 424, data processing service 426, and prediction service 428. Orchestration service 424 may receive failure log data through external endpoint 422 and may pass the data to data processing service 426. Data processing service may vectorize the failure log data, for example using TFIDF processing similar to the processing used on the training logs at 404. Accordingly, the failure log data may be vectorized in the same manner as the training data. Orchestration service 424 may pass the vector to prediction service 428, which may compare the vector with the labeled trained vectors from 418. If the vector matches a vector in the trained data, prediction service 428 may label the vector with the same label applied to the matching vector in the trained data. Thus, data prediction service 160 may output a label for the problem represented by the failure log data. Notification service 150 may report the label, in some embodiments along with the failure log data, to appropriate individuals and/or services that may be trained and/or configured to address problems of the labeled type.

As described above, prediction service 160 may be configured to perform problem and/or failure classification by vectorizing log data and comparing the vector to a set of known, labeled vectors. Accordingly, prediction service 160 may repeatedly and independently classify issues in real time or near real time with limited computational resource use.

Figure 5A:
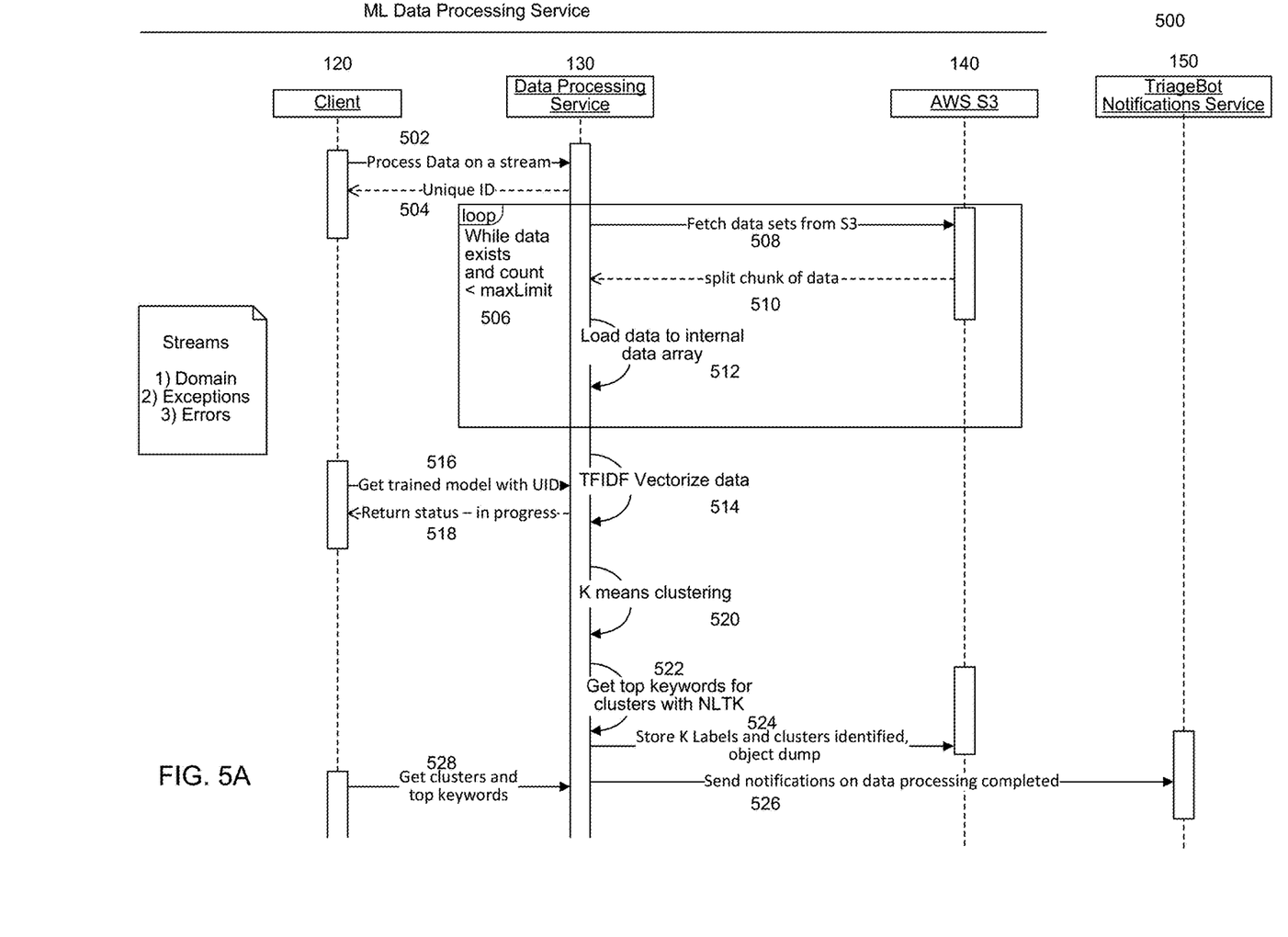
FIGS. 5A-5B show a set of data processing operations according to an embodiment of the present disclosure.
Figure 5B:
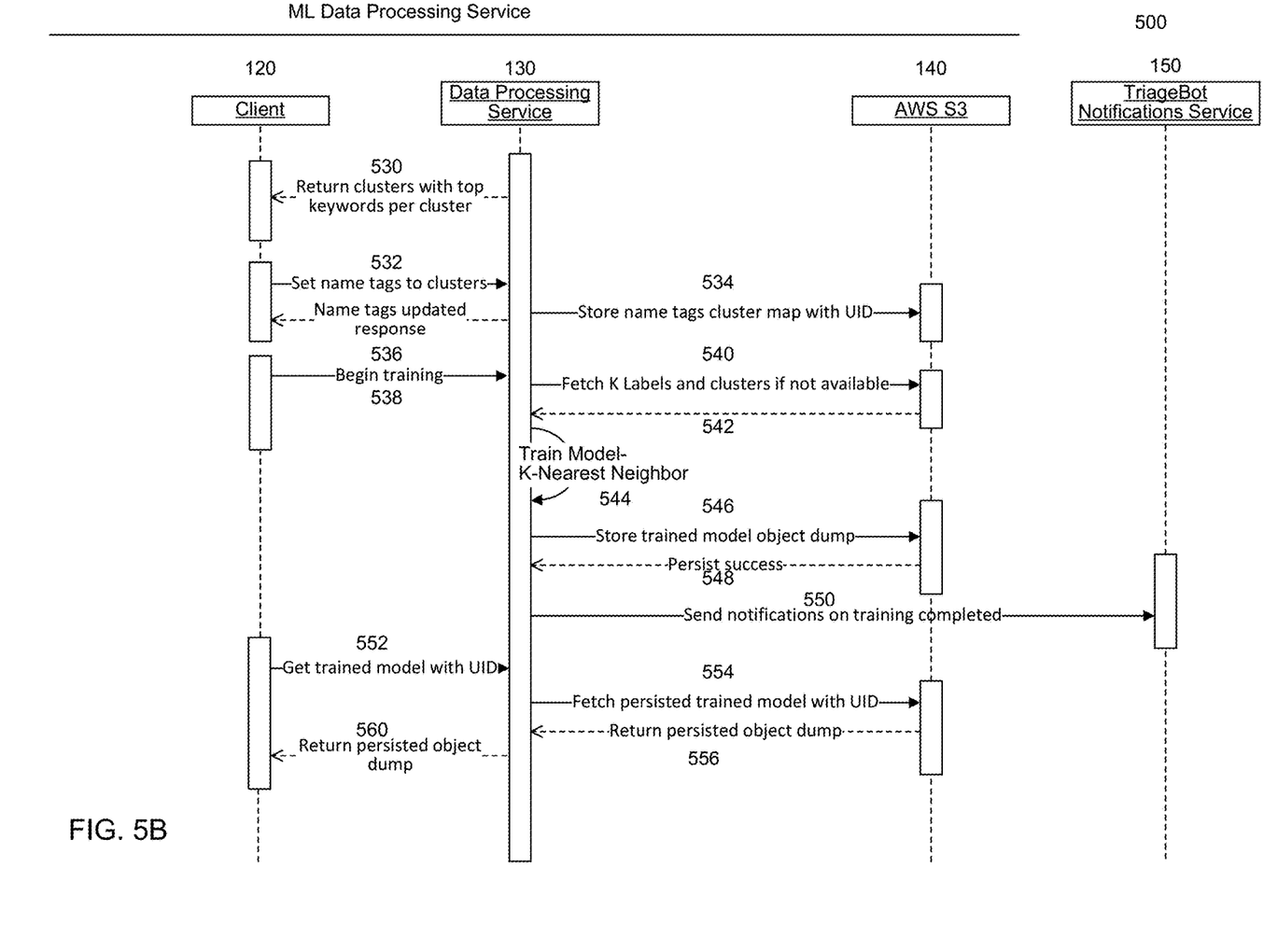

FIGS. 5A-5B show a set of data processing operations 500 according to an embodiment of the present disclosure. FIGS. 5A-5B specifically show interactions that may take place between system 100 elements through network 110, such as client 120, data processing service 130, web service 140, notification service 150, and/or data prediction service 160, during the clustering and training described above. Accordingly. FIGS. 5A-5B illustrate data flows within system 100 for clustering and training in some example embodiments. However, in other embodiments, different system 100 elements may perform the operations 500 shown, so in these embodiments the interactions may be different.

At 502, client 120 may send data logs to data processing service 130 for storage by data processing service 130 (e.g., locally or with web service 140) as described above. In some embodiments, client 120 may send a link to the data rather than the data itself and data processing service 130 may obtain the data from the linked location. This may be an ongoing process whereby client 120 may repeatedly send the data logs as they are generated. To facilitate correlation of additional logs with the same client 120, at 504, data processing service 130 may send a unique ID to client 120 after receiving the first log (or prior to receiving the first log in some embodiments). Client 120 may include the unique ID in future log transmissions, and data processing service 130 may use the unique ID to associate all of the logs from a given client 120 with one another. In some embodiments, there may be multiple clients 120 sending logs, and data processing service 130 may provide a separate unique ID to each such client 120.

After multiple logs have been received from one or more clients 120, at 506, data processing service 130 may assemble log data to be processed further. For log data stored by web service 140, at 508, data processing service 130 may request the log data. At 510, web service 140 may respond to the request at 508 by sending chunks of the data. For example, web service 140 may split the data into chunks for transmission over network 110 to avoid transmission problems that may be associated with sending very large files. At 512, data processing service 130 may load the data to an internal data array. For example, data processing service 130 may arrange the data into multiple streams as described above.

At 514, data processing service 130 may vectorize the data as described above. If, at 516, client 120 requests a trained model before the trained model is ready, then, at 518, data processing service 130 may reply with a message indicating that preparation of the trained model is in progress. While the interaction at 516-518 is shown during the vectorizing phase in FIG. 5A, this interaction may take place at any time prior to completion of the trained model (e.g., see 552 below), or may not take place at all in some cases.

At 520, data processing service 130 may perform clustering as described above. At 522, data processing service 130 may perform labeling of clusters as described above. At 524, data processing service 130 may store the labeled clusters with web service 140.

At 526, data processing service 130 may use notification service 150 to send a notification that the labeled clusters have been generated. For example, notification service 150 may notify users through SMS messages. MMS messages, emails, chat messages, push notifications, or using any other communications technique available to system 100. In some embodiments, notification service 150 may notify one or more processes running on one or more system 100 elements or other devices using APIs or other techniques.

At 528, client 120 may request the labeled cluster data from data processing service 130 in some embodiments. For example, client 120 may request the data in response to receiving a notification sent by notification service 150 at 526. At 530, data processing service 130 may send the requested labeled cluster data to client 120 in response to the request. In some embodiments, the request may be a user-generated request. In some embodiments, the request may be automatically generated by a process of client 120. In some embodiments, the request 528 and response at 530 may not take place (e.g., a client 120 may not want or need the labeled cluster data, only trained models which may be generated as described below).

In some embodiments, client 120 may be able to modify the labels generated above. For example, a user may inspect labeled clusters sent at 530 and decide to change or enhance one or more labels to better describe the problem(s) or failure(s) associated with one or more clusters. At 532, client 120 may send label modification information indicating the changes to data processing service 130. At 534, data processing service 130 may update the data stored in web service 140 with the changes. At 536, data processing service 130 may send a notification to client 120 indicating that the changes have been made. Elements 532-536 may be optional in some embodiments, only taking place if label changes are desired.

With the availability of labeled clusters, the training described above may begin. In some embodiments, at 538, client 120 may direct data processing service 130 to begin training (e.g., in response to a user request to begin training). In other embodiments, training may begin automatically without the communication at 538. At 540, data processing service 130 may fetch labeled cluster data from web service 140 if it is not available locally. In this case, at 542, web service 140 may send the labeled cluster data to data processing service 130 in response. At 544, data processing service 130 may train the model as described above. As tat rained model data is generated, at 546, data processing service 130 may store the trained model data with web service 140. At 548, web service 140 may reply to data processing service 130 indicating whether the storage of the trained model data has been successful.

At 550, data processing service 130 may use notification service 150 to send a notification that the trained models have been generated. For example, notification service 150 may notify users through SMS messages, MMS messages, emails, chat messages, push notifications, or using any other communications technique available to system 100. In some embodiments, notification service 150 may notify one or more processes running on one or more system 100 elements or other devices using APIs or other techniques.

At 552, client 120 may request the trained model data from data processing service 130 in some embodiments. For example, client 120 may request the data in response to receiving a notification sent by notification service 150 at 550. The request may include the unique ID associated with client 120, for example to ensure that the trained model data sent to client 120 is relevant to the application(s) used by client 120. In order to respond to the request, at 554, data processing service 130 may request the trained model data relevant to the unique ID from web service 140. At 556, web service 140 may send the requested trained model data to data processing service 140. At 560, data processing service 130 may send the requested trained model data to client 120 in response to the request. In some embodiments, the request may be a user-generated request. In some embodiments, the request may be automatically generated by a process of client 120. In some embodiments, the process 552-560 may not take place (e.g., a client 120 may not want or need the trained model data).

Figure 6:
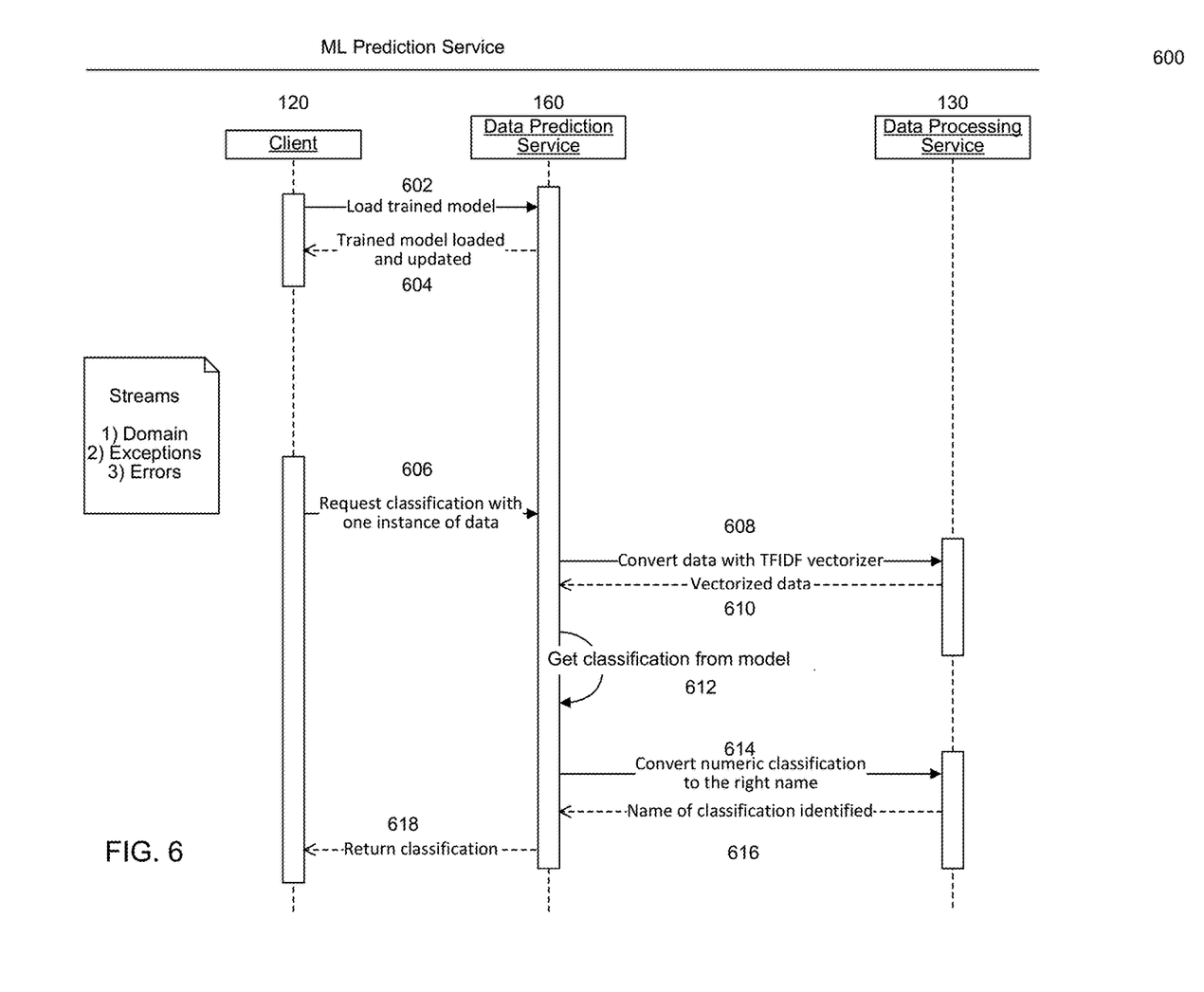
FIG. 6 shows a set of prediction operations according to an embodiment of the present disclosure.

FIG. 6 shows a set of prediction operations 600 according to an embodiment of the present disclosure. FIG. 6 specifically shows interactions that may take place between system 100 elements through network 110, such as client 120, data processing service 130, web service 140, notification service 150, and/or data prediction service 160, during the classification described above. Accordingly, FIG. 6 illustrates data flows within system 100 for classification in some example embodiments. However, in other embodiments, different system 100 elements may perform the operations 600 shown, so in these embodiments the interactions may be different.

At 602, client 120 may load the trained model into data prediction service 160. For example, if client 120 requested and received the trained model data at 552-560 of operations 500, client 120 may provide the trained model data to data prediction service 160. In other embodiments, data processing service 130 may provide the trained model data to data prediction service 160, or data prediction service 160 may obtain the trained model data from web service 140. At 604, client 120 may inform the sender of the trained model data (e.g., client 120) that the trained model has been loaded.

At 606, data prediction service 160 may receive log data associated with a problem or failure for classification. For example, client 120 may send a log to data prediction service 160 after experiencing a problem or failure.

As described above, the log may be vectorized. In the embodiment of FIG. 6, at 608, data prediction service 160 may send the log data to data processing service 130 for vectorization. At 610, data processing service 130 may send the vector to data prediction service 160. In other embodiments, data prediction service 160 may perform the vectorization.

At 612, data prediction service 160 may compare the vector with the trained model data to identify a matching vector in the trained model data to classify the problem or failure. As noted above, this process may be computationally simple compared to the clustering and training, allowing data prediction service 160 to triage the problem or failure quickly and with minimal processing. In the embodiment of FIG. 6, at 614, data prediction service 160 may send the vector identified in the trained model data to data processing service 130 to request its natural language label. At 616, data processing service 130 may send the label to data prediction service 160. In other embodiments, data prediction service 160 may look up the label itself. At 618, data prediction service 160 may send the label to client 120, thereby informing client 120 of the classification of the problem or failure in its log.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of classifying a problem associated with an application, comprising:
   receiving, at a processor, a log including a record of at least one operation performed by at least one application, the log comprising details of a problem in execution of the at least one application;
   selecting, by the processor, an error model of a plurality of error models for the log based on the at least one operation, each error model comprising a plurality of trained vectors;
   generating, by the processor, a vector based on the record;
   comparing, by the processor, the vector to the plurality of trained vectors of the selected error model each being associated with a separate label, each separate label comprising a natural language label describing a type of problem in execution of the at least one application;
   determining, by the processor, a most similar one of the plurality of trained vectors to the vector based on the comparing;
   assigning, by the processor, a label associated with the most similar one of the plurality of trained vectors to the vector;
   selecting, by the processor, a recipient from among a plurality of available recipients based on the type of problem described in the label assigned by the processor; and
   causing, by the processor, the log to be further processed by the recipient.

2. The method of claim 1, wherein the causing includes sending a notification to a recipient associated with the label assigned by the processor.

3. The method of claim 1, further comprising generating, by the processor, the plurality of trained vectors.

4. The method of claim 3, wherein the generating of the plurality of trained vectors includes:
   receiving a plurality of logs;
   dividing the plurality of logs into a plurality of streams each including logs associated with a different type of application problem or failure;
   generating a separate vector for each log in each stream; and
   for each stream:
      clustering each separate vector into a plurality of clusters;
      generating a label for each of the plurality of clusters; and
      generating a trained data set for each of the plurality of clusters using a machine learning process, each trained data set together comprising the plurality of trained vectors.

5. The method of claim 4, further comprising verifying, by the processor, at least one of the label for each of the plurality of clusters and the trained data set for each of the plurality of clusters.

6. The method of claim 3, wherein the generating of the plurality of trained vectors includes:
   receiving a plurality of logs; and
   dividing the plurality of logs into a plurality of streams each including logs associated with a different type of application problem or failure.

7. The method of claim 3, wherein the generating of the plurality of trained vectors includes:
   receiving a plurality of logs; and
   generating a separate vector for each log.

8. The method of claim 3, wherein the generating of the plurality of trained vectors includes:
   receiving a plurality of logs; and
   clustering the plurality of logs into a plurality of clusters.

9. The method of claim 8, wherein the clustering includes applying a k-means clustering algorithm.

10. The method of claim 8, wherein the generating of the plurality of trained vectors includes generating a label for each of the plurality of clusters.

11. The method of claim 8, wherein the generating of the plurality of trained vectors includes generating a trained data set for each of the plurality of clusters using a machine learning process, each trained data set together comprising the plurality of trained vectors.

12. The method of claim 11, wherein the machine learning process includes applying a k-nearest neighbor algorithm.

13. A system configured to classify a problem associated with an application, comprising:
    a memory configured to store a plurality of trained vectors and a plurality of labels; and
    a processor in communication with the memory, the processor configured to:
       receive a log including a record of at least one operation performed by at least one application, the log comprising details of a problem in execution of the at least one application;
       select an error model of a plurality of error models for the log based on the at least one operation, each error model comprising a plurality of trained vectors;
       generate a vector based on the record;
       compare the vector to the plurality of trained vectors of the selected error model, each of the plurality of trained vectors being associated with a separate one of the plurality of labels, wherein each of the plurality of labels comprising a natural language label describing a type of problem in execution of the at least one application;
       determine a most similar one of the plurality of trained vectors to the vector based on the comparing;
       assign a label associated with the most similar one of the plurality of trained vectors to the vector;
       select a recipient from among a plurality of available recipients based on the type of problem described in the label assigned by the processor; and
       cause the log to be further processed by the recipient.

14. The system of claim 13, wherein the processor is configured to cause the log to be further processed by the recipient by a process including sending a notification to a recipient associated with the label assigned by the processor.

15. The system of claim 13, wherein the processor is further configured to generate the plurality of trained vectors.

16. The system of claim 15, wherein the processor is configured to generate the plurality of trained vectors by a process including:
    receiving a plurality of logs;
    dividing the plurality of logs into a plurality of streams each including logs associated with a different type of application problem or failure;

generating a separate vector for each log in each stream; and for each stream:

clustering a separate vector into a plurality of clusters;

generating a label for each of the plurality of clusters; and generating a trained data set for each of the plurality of clusters using a machine learning process, each trained data set together comprising the plurality of trained vectors.

17. The system of claim 16, wherein the processor is further configured to verify at least one of the label for each of the plurality of clusters and the trained data set for each of the plurality of clusters.

18. The system of claim 15, wherein the processor is configured to generate the plurality of trained vectors by a process including:

receiving a plurality of logs; and dividing the plurality of logs into a plurality of streams each including logs associated with a different type of application problem or failure.

19. The system of claim 15, wherein the processor is configured to generate the plurality of trained vectors by a process including:

receiving a plurality of logs; and generating a separate vector for each log.

20. The system of claim 15, wherein the processor is configured to generate the plurality of trained vectors by a process including:

receiving a plurality of logs; and clustering the plurality of logs into a plurality of clusters.

21. The system of claim 20, wherein the clustering includes applying a k-means clustering algorithm.

22. The system of claim 20, wherein the generating of the plurality of trained vectors includes:

generating a label for each of the plurality of clusters.

23. The system of claim 20, wherein the generating of the plurality of trained vectors includes generating a trained data set for each of the plurality of clusters using a machine learning process, each trained data set together comprising the plurality of trained vectors.

24. The system of claim 23, wherein the machine learning process includes applying a k-nearest neighbor algorithm.

* * * * *